(12) United States Patent
Moglianetti et al.

(10) Patent No.: US 12,138,691 B2
(45) Date of Patent: Nov. 12, 2024

(54) METHOD FOR THE SYNTHESIS OF MESOPOROUS PLATINUM NANOPARTICLES IN AN AQUEOUS ENVIRONMENT

(71) Applicant: FONDAZIONE ISTITUTO ITALIANO DI TECNOLOGIA, Genoa (IT)

(72) Inventors: Mauro Moglianetti, Civitanova Marche (IT); Deborah Pedone, Palagiano (IT); Pier Paolo Pompa, Genoa (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 527 days.

(21) Appl. No.: 17/603,518

(22) PCT Filed: Apr. 14, 2020

(86) PCT No.: PCT/IB2020/053497
§ 371 (c)(1),
(2) Date: Oct. 13, 2021

(87) PCT Pub. No.: WO2020/212839
PCT Pub. Date: Oct. 22, 2020

(65) Prior Publication Data
US 2022/0184701 A1   Jun. 16, 2022

(30) Foreign Application Priority Data
Apr. 17, 2019 (IT) .......................... 102019000005964

(51) Int. Cl.
*B22F 9/24* (2006.01)
*B22F 1/054* (2022.01)
*B82Y 40/00* (2011.01)

(52) U.S. Cl.
CPC ............... *B22F 9/24* (2013.01); *B22F 1/054* (2022.01); *B22F 1/0549* (2022.01);
(Continued)

(58) Field of Classification Search
None
See application file for complete search history.

(56) References Cited

U.S. PATENT DOCUMENTS 8,540,796 B1 * 9/2013 van Swol ............... B82Y 30/00
                                                           75/255
2016/0329121 A1 * 11/2016 Xiao ........................ H01B 1/04

FOREIGN PATENT DOCUMENTS

WO       2017103807 A1    6/2017

OTHER PUBLICATIONS

Fang, Z. et al., "Growth of Anisotropic Platinum Nanostructures Catalyzed by Gold Seed Nanoparticles", Nano Research, vol. 1, pp. 249-257, Sep. 3, 2008.*
(Continued)

*Primary Examiner* — George Wyszomierski
(74) *Attorney, Agent, or Firm* — Ferguson Case Orr Paterson (57) ABSTRACT

A method for producing mesoporous platinum nanoparticles without using templating agents is provided. The method involves preparing a solution comprising water, platinum nanoparticle seeds, a platinum salt and a reducing agent, and heating the solution to a temperature between 150° C. and 250° C. at a rate of between 1° C./min and 15° C./min under a pressure of between 5 and 20 atm. The method allows obtaining mesoporous platinum nanoparticles having controlled shape and controlled pore dimensions. The mesoporous platinum nanoparticles are useful as catalysts in
(Continued)

chemical precision reactions and for the production of artificial enzymes for diagnostics and nanomedicine applications.

11 Claims, 3 Drawing Sheets

(52) U.S. Cl.
CPC ..... *B22F 2301/25* (2013.01); *B22F 2304/054* (2013.01); *B82Y 40/00* (2013.01); *Y10S 977/896* (2013.01)

(56) References Cited

OTHER PUBLICATIONS

International Search Report, issued in PCT/IB2020/053497, mailed Jul. 20, 2020, Rijswijk, NL.
Xiaowei Teng et al., Synthesis of Porous Platinum Nanoparticles, Small: Nano-Micro, Feb. 1, 2006, pp. 249-253, vol. 2, No. 2, Wiley-VCH Verlag, Weinheim, DE.
Dequan Yang et al., Formation of a Porous Platinum Nanoparticle Froth for Electrochemical Applications, Produced without Templates, Surfactants, or Stabilizers, Chemistry of Materials, Jul. 1, 2008, pp. 4677-4681, vol. 20, No. 14, ACS Publications, US.
Jon Ustarroz et al., Electrodeposition of Highly Porous Pt Nanoparticles Studied by Quantitative 3D Electron Tomography: Influence of Growth Mechanisms and Potential Cycling on the Active Surface Area, ACS Applied Materials & Interfaces, May 17, 2017, pp. 16168-16177, vol. 9, No. 19, ACS Publications, US.
Li C. et al., Emerging Pt-based electrocatalysts with highly open nanoarchitectures for boosting oxygen reduction reaction, Nano Today, Jul. 19, 2018, pp. 91-105, vol. 21, Elsevier Ltd.
Shaowen Cao et al., Size- and shape-dependent catalytic performances of oxidation and reduction reactions on nanocatalysts, Chemical Society Reviews, Sep. 7, 2016, pp. 4747-4765, Issue 17, 45, Royal Society of Chemistry, GB.
Nobutaka Maeda et al., Asymmetric Hydrogenation on Chirally Modified Pt: Origin of Hydrogen in the N—H—O Interaction between Cinchonidine and Ketone, Journal of the American Chemical Society, Nov. 15, 2011, pp. 19567-19569, vol. 133, Issue 49, ACS Publications, US.
Laura J. Kingsley, Markus A. Lill, Substrate tunnels in enzymes: Structure-function relationships and computational methodology, Proteins, Structure—Function—Bioinformatics, first published Feb. 7, 2015, pp. 599-611, vol. 83, Issue 4, Wiley Periodicals, US.
Yingze Cao et al., Mesoporous SiO2-Supported Pt Nanoparticles for Catalytic Application, International Scholarly Research Notices Nanomaterials, Mar. 10, 2013, vol. 2013, Article ID 745397, 7 pages, Hindawi Publishing Corporation, GB.
K. S. W. Sing et al., Reporting Physisorption Data for Gas/Solid Systems with Special Reference to the Determination of Surface Area and Porosity (Recommendations 1984), Pure and Applied Chemistry, 1985, pp. 603-619, vol. 57, No. 4, IUPAC, GB.
Hong Jin Fan et al., Formation of Nanotubes and Hollow Nanoparticles Based on Kirkendall and Diffusion Processes: A Review, Small: Nano-Micro, Oct. 1, 2007, pp. 1660-1671, vol. 3, No. 10, Wiley-VCH Verlag, Weinheim, DE.
Jiang-Lan Shui et al., Evolution of Nanoporous Pt—Fe Alloy Nanowires by Dealloying and their Catalytic Property for Oxygen Reduction Reaction, Advanced Functional Materials, Sep. 9, 2011, pp. 3357-3362, vol. 21, Issue17, Wiley-VCH Verlag, Weinheim, DE.
Bryan D. Anderson; Joseph B. Tracy, Nanoparticle conversion chemistry: Kirkendall effect, galvanic exchange, and anion exchange, Nanoscale, Nov. 7, 2014, pp. 12195-12216, vol. 6, Issue 21, the Royal Society of Chemistry, GB.
Jeong Y. Park et al., The Role of Organic Capping Layers of Platinum Nanoparticles in Catalytic Activity of CO Oxidation, Catalysis Letters, Feb. 4, 2009, pp. 1-6, vol. 129, Springer.
Kuhn, J. N. et al., Effect of Organic Capping Layers over Monodisperse Platinum Nanoparticles upon Activity for Ethylene Hydrogenation and Carbon Monoxide Oxidation, Journal of Catalysis, May 29, 2009, vol. 265; Issue 2, Lawrence Berkeley National Laboratory.
F.J.Vidal-Iglesias et al., Evaluating the ozone cleaning treatment in shape-controlled Pt nanoparticles: Evidences of atomic surface disordering, Electrochemistry Communications, May 2011, pp. 502-505, vol. 13, Issue 5, Elsevier B.V.
George S. Attard et al., Mesoporous Platinum Films from Lyotropic Liquid Crystalline Phases, Science, Oct. 31, 1997, pp. 838-840, vol. 278, Issue 5339, the American Association for the Advancement of Science, US.
Yunqi Li et al., Polymeric Micelle Assembly for the Smart Synthesis of Mesoporous Platinum Nanospheres with Tunable Pore Sizes, Angewandte Chemie, Int. Ed., Sep. 14, 2015, pp. 11073-11077, vol. 54, Issue 38, Wiley-VCH Verlag, Weinheim, DE.
Jiang Bo et al., Layer-by-Layer Motif Architectures: Programmed Electrochemical Syntheses of Multilayer Mesoporous Metallic Films with Uniformly Sized Pores, Angewandte Chemie, Int. Ed. Jun. 26, 2017, pp. 7836-7841, vol. 56, Issue 27, Wiley-VCH Verlag, Weinheim, DE.
Lim, B. et al., Pd—Pt Bimetallic Nanodendrites with High Activity for Oxygen Reduction, Science, Reports, Jun. 5, 2009, pp. 1302-1305 , vol. 324, Issue 5932, the American Association for the Advancement of Science, US.
Hui Zhang et al., Shape-Controlled Synthesis of Pd Nanocrystals and Their Catalytic Applications, Accounts of Chemical Research, published online Nov. 19, 2012, pp. 1783-1794, vol. 46, No. 8, the American Chemical Society, US.
Gammer C. et al., Quantitative local profile analysis of nanomaterials by electron diffraction, Scripta Materialia available online Apr. 18, 2010, pp. 312-315, vol. 63, Issue 3, Elsevier Ltd.
Moglianetti M. et al., Citrate-Coated, Size-Tunable Octahedral Platinum Nanocrystals: A Novel Route for Advanced Electrocatalysts, ACS Applied Materials & Interfaces, Nov. 8, 2018, pp. 41608-41617, vol. 10, Issue 48, ACS Publications, US.
Bigall Nadja C. et al., Monodisperse Platinum Nanospheres with Adjustable Diameters from 10 to 100 nm: Synthesis and Distinct Optical Properties, Nano Letters, Nov. 5, 2008, pp. 4588-4592, vol. 8, Issue 12, ACS Publications, US.
Moglianetti M. et al., Platinum nanozymes recover cellular ROS homeostasis in an oxidative stress-mediated disease mode, Nanoscale, 2016, pp. 3739-3752, vol. 8, Issue 6, the Royal Society of Chemistry, GB.
International Written Opinion, issued in PCT/IB2020/053497, mailed Jul. 20, 2020.

* cited by examiner

METHOD FOR THE SYNTHESIS OF MESOPOROUS PLATINUM NANOPARTICLES IN AN AQUEOUS ENVIRONMENT

CROSS-REFERENCE TO RELATED APPLICATIONS

This application is a National Phase Application of PCT International Application No. PCT/IB2020/053497, having an International Filing Date of Apr. 14, 2020, which claims the benefit of priority to Italian Patent Application No. 102019000005964, filed Apr. 17, 2019, each of which is hereby incorporated by reference in its entirety.

FIELD OF THE INVENTION

The present invention relates to a method for preparing mesoporous platinum nanoparticles having a controlled shape and controlled dimensions, in particular a spherical shape. The method does not involve the use of agents that act as templates, such as polymers, surfactants or other sacrificial materials that can promote porosity.

BACKGROUND OF THE INVENTION

Platinum nanoparticles having mesoporous structures, that is having pores with a diameter of from 2 nm to 50 nm according to the IUPAC classification, are attracting an increasing amount of attention due to their potential application in catalysts, in photonics and in other fields, such as nanomedicine. The mesoporous structure can have a strong influence on the properties of the nanomaterial, in particular selectivity during catalytic reactions and interaction with light and living matter. In particular, the presence of pores having a diameter of from 2 nm to 5 nm plays a fundamental role in controlling the activity and selectivity of the platinum nanoparticles in the catalysis of reactions such as hydrogenation of alpha-ketoesters and olefins having a different length, and the reduction of aromatic compounds and nitroaromatic compounds (Li, C. et al, *Nano Today* 2018, 21, 91-105; Shaowen Cao et al; "Size- and shape-dependent catalytic performances of oxidation and reduction reactions on nanocatalysts" Chem. Soc. Rev., 2016, 45,4747; Nobutaka Maeda et al; "Asymmetric Hydrogenation on Chirally Modified Pt: Origin of Hydrogen in the N—H—O Interaction between Cinchonidine and Ketone" *J. Am. Chem. Soc.*, 2011, 133 (49), pp 19567-19569), and also in the imitation of the catalytic sites of natural enzymes in bio-enzymatic processes, such as polyamine oxidase (POA) and acetylcholinesterase (AcheE), which have cavities of approximately 3 nm and 2 nm, respectively, as active sites. In particular, the scientific article "Substrate Tunnels in Enzymes: Structure-Function Relationships and Computational Methodology" by Laura J. Kingsley and Markus A. Lill, Proteins, 2015, 83, 599 shows how, within the context of enzymes, mesoporous morphology is essential for having specific catalytic activity. Therefore, by reproducing similar morphology on the platinum particles, these could conveniently be used for enzyme-imitation activity.

Furthermore, the mesoporous structure of the platinum nanoparticles, in particular nanoparticles having dimensions of from 2-5 nm, makes it possible to decorate the pores with organic molecules that can give the pores new chemical functions, thereby increasing the selectivity thereof, or providing additional catalytic properties, such as thiols, peptides and nucleic acids.

In the field of gas purification, too, with particular regard to harmful gas emissions of cars, the mesoporous structure of platinum-based catalysts is considered to be particularly advantageous for the catalytic activity compared with the microporous structure. It has been stated in the literature, in fact, that catalysts consisting of mesoporous silicon oxide ($SiO_2$) nanoparticles containing platinum have greater catalytic activity than the same catalysts that are characterized by a microporous structure ("Mesoporous $SiO_2$-Supported Pt Nanoparticles for Catalytic Application" Yingze Cao, Wentao Zhai, Xiang Zhang, Shuxi Li, Lin Feng, and Yen Wei, ISRN Nanomaterials Volume 2013, Article ID 745397, page 7).

This is confirmed by K. S. W. Sing, D. H. Everett, R. A. W. Haul et al., who, in the document "Reporting physisorption data for gas/solid systems with special reference to the determination of surface area and porosity (Recommendations 1984)," Pure and Applied Chemistry, vol. 57, no. 4, pp. 603-619, 1985, states that, in reference to mesoporous silicon oxide ($SiO_2$) and platinum particles, it is well known that the gas diffuses more quickly and freely through mesoporous particles than through particles of the same material having a microporous structure, and that carbon monoxide (CO) therefore has a greater chance of being oxidized than platinum. The authors report that carbon dioxide ($CO_2$) produced by means of this oxidation process moves away from the catalyst having mesopores more easily and that catalysts based on silicon oxide and platinum particles that have mesopores therefore have better activity than the same catalysts that have micropores.

The catalytic activity of the mesoporous platinum nanoparticles is also particularly influenced by the dimensional distribution of the pores. The high dimensional distribution of the pores severely damages the catalytic selectivity, thus limiting the possibility of controlling the reaction by means of the dimensions of the pores. The distribution of the dimensions of the pores of the mesoporous platinum nanoparticles therefore has to be as limited as possible.

The synthetic strategies most commonly used to date to obtain mesoporous platinum nanoparticles are based on three approaches: the Kirkendall effect, dealloying or selective corrosion and "soft-templating."

The synthesis techniques based on the Kirkendall effect make use of the known metallurgical Kirkendall effect, which involves mutual diffusion of the atoms at the interface between a metal nanoparticle and a layer of material that covers the surface thereof. In particular, the diffusion coefficients of the two materials are not equal; as a result, the interface is displaced over time, which is associated with the different rates of diffusion of the atoms of the metals involved. More specifically, a net flow of atoms is observed from the material having a higher diffusion coefficient, that is that of the nanoparticle, towards the outer layer having a lower diffusion coefficient. In order to balance the flow imbalance, the vacancies diffuse in the opposite direction, towards the inner nanoparticle. These vacancies may, over time, accumulate and cause internal porosities that may, in turn, coalesce ("Formation of nanotubes and hollow nanoparticles based on Kirkendall and diffusion processes: a review" Fan HJ, Gösele U, Zacharias M., Small 2007, October; 3(10):1660-71).

However, this approach provides more than one passage, and additionally a post-treatment of the nanomaterial when one of the two species involved in the synthesis process is intended to be removed. The presence of a second species may, in fact, promote non-homogeneous zones.

The second approach mentioned above, that is the dealloying approach, is based on the selective separation, in a metal alloy, of the less noble metal component, and therefore the rearrangement of the remaining noble metal atoms, by means of a chemical or electrochemical method. With this approach, Shui et al. produced porous iron-platinum nanowires ("Evolution of nanoporous Pt—Fe alloy nanowires by dealloying and their catalytic property for oxygen reduction reaction" Shui, J.-l.; Chen, C.; Li, J. C. M. Advanced Functional Materials 2011, 21 (17), 3357-3362,). However, by using this method porous structures with defects and free spaces are obtained, which may contract on themselves. Furthermore, this method, like the approach based on the Kirkendall effect in the case mentioned above, requires additional treatment of the nanoparticles after they have been synthesized, which is often difficult to control.

In addition, the incomplete removal of the less noble metal component of the initial alloy may largely jeopardize the purity of the nanomaterial in the same way as the incomplete diffusion of the atoms in the technique based on the Kirkendall effect, causing high heterogeneity in the surface atomic composition (Bryan D. Anderson and Joseph B. Tracy, ("Nanoparticle conversion chemistry: Kirkendall effect, galvanic exchange, and anion exchange" Nanoscale, Volume 6, Issue 21, 7 Nov. 2014, Page 12159-13256).

The third approach of "soft-templating" mentioned above is the most commonly used approach and is based on a "template" (or skeleton) consisting of "soft" materials, such as polymers, surfactants, ionic salts and organic ligands, which shall be called "in the following soft templating" agents. Once the synthesis process is over, this skeleton is removed by means of chemical and/or physical attack, thereby tuning the porous morphology of the end structure in a manner that is difficult to control. Therefore, the techniques for synthesizing mesoporous platinum nanoparticles based on this approach require soft-templating agents to promote the formation of the pores.

However, these substances are difficult to remove from the nanoparticles after they have been synthesized and residues of these substances on the surface of the nanoparticles negatively affect the catalytic properties of the material. In particular, it has been stated in the literature that the "soft-templating" agents more commonly used, that is to say polyvinylpyrrolidone (PVP), tetradecyltrimethylammonium bromide and oleylamine, alter the surface properties of the material, reducing the catalytic properties thereof ("The Role of Organic Capping Layers of Platinum Nanoparticles in Catalytic Activity of CO Oxidation." *Catal Lett* 2009, 129 (1-2), 1-6; Park, J. et al.; "Effect of organic capping layers over monodisperse platinum nanoparticles upon activity for ethylene hydrogenation and carbon monoxide oxidation." Kuhn, J. N. et al., *Journal of Catalysis* 2009, 265 (2), 209-215).

In the literature, different methods are mentioned for completely removing these substances from the surface of the platinum nanoparticles. However, the majority of these treatments require a lot of time, are expensive, do not guarantee complete removal and, most importantly, may interfere with the surface structure and therefore with the catalytic properties of the nanocrystals ("Evaluating the ozone cleaning treatment in shape-controlled Pt nanoparticles: Evidences of atomic surface disordering." Vidal-Iglesias, et al., *Electrochemistry Communications* 2011, 13 (5), 502-505).

In the past few years, a few strategies for synthesizing porous platinum nanoparticles have attracted a significant amount of attention, which are based on "soft-templating," which can significantly reduce the use of surfactants in order to be more respectful of the environment. Among these, the approach with lyotropic liquid crystals described in the literature has shown to be particularly versatile, flexible and effective ("Mesoporous Platinum Films from Lyotropic Liquid Crystalline Phases." Attard et al., *Science* 1997, 278 (5339), 838-840).

The article "Polymeric Micelle Assembly for the Smart Synthesis of Mesoporous Platinum Nanospheres with Tunable Pore Sizes" *Angewandte Chemie International Edition* 2015, 54 (38), 11073-11077 by Yamauchi et al. mentions a method based on the use of surfactant micelles that requires a much lower amount of surfactants than the previous methods.

Methods based on the formation of micelles followed by electrodeposition led to the synthesis of multilayer mesoporous Pd/PdPt films as stated by Jiang, B. et al. in the article "Layer-by-Layer Motif Architectures: Programmed Electrochemical Syntheses of Multilayer Mesoporous Metallic Films with Uniformly Sized Pores," *Angewandte Chemie, International Edition* 2017, 56 (27), 7836-7841).

In the literature, a method of "soft-templating" is also reported, which completely avoids the use of surfactants to promote the nanodendritric morphology of platinum nanoparticles by using polyvinylpyrrolidone (PVP) and palladium seeds ("Pd—Pt Bimetallic Nanodendrites with High Activity for Oxygen Reduction." Lim, B. et al., *Science* 2009, 324 (5932), 1302-1305). However, it has been observed that the dendritic nanoparticles obtained by this method do not have homogeneous mesoporous morphology but rather a rough surface having not homogeneous surface cavities. Furthermore, the literature clearly states that traces of PVP and other polymers commonly used as colloidal stabilizers for the synthesis in solution of nanocrystals of noble metals, such as platinum, remain on the surface of the nanomaterial even after long washing cycles and centrifugation. This polymeric residue can block the active sites of the nanomaterial as a result of a persistent bond to the catalytic surface, and can stop the reagents from reaching the surface. However, the polymer cannot be removed using aggressive conditions that cause structural changes to the surface of the nanomaterial, thus causing said material to lose morphological characteristics, and therefore the removal has to be done in the mildest possible conditions ("Accounts of Chemical research," Hui Zang et al., 2013, 1783, Vol. 46 No 8).

At present, despite the progress in the field of the production of porous platinum nanoparticles, simple and eco-compatible methods for obtaining mesoporous platinum nanoparticles having controlled dimensions and a controlled shape have not yet been described, which have pores that are homogeneous and which are devoid of surface contaminants that are difficult to remove.

In view of the above, there is now a strong need to be able to provide a preparation method of this type.

SUMMARY OF THE INVENTION

The purpose of the present invention is therefore to provide a method for preparing mesoporous platinum nanoparticles that overcomes the above-mentioned limitations of the prior art.

In view of this purpose, the invention consists in a method of preparing mesoporous platinum nanoparticles having the features defined in the appended claims.

Additional advantages and the features of the method of the invention will become clear from the following description, with regards to both the general features of the method and some specific embodiments.

DETAILED DESCRIPTION

The method according to the invention applies to the synthesis of mesoporous platinum nanoparticles having a controlled shape and controlled dimensions, in particular spherical particles having restricted dimensional distribution of the pores and dimensions of the nanoparticles themselves.

The method of the invention comprises the steps of:
a) providing a solution comprising water, platinum nanoparticle seeds, a platinum ions precursor and a reducing agent; and
b) heating the solution to a temperature of between 150-250° C., preferably to 200° C., at a pressure of between 5 atm and 20 atm, preferably at 15 atm.

The solution is heated in a closed container.

The solution does not comprise an organic solvent and/or a soft-templating agent and/or other sacrificial materials.

The term "platinum nanoparticle seeds," which is indicated in the following as "seeds" for short, means a platinum single crystalline nanoparticle or multiple crystal having a certain crystalline structure, from which it is possible to form a large platinum nanoparticle.

Platinum nanoparticle seeds having average dimensions of between 1.5 nm and 3.5 nm have been used to synthesize spherical mesoporous platinum nanoparticles having average dimensions of between 10 and 20 nm.

In a preferred embodiment, the seeds having average dimensions of between 1.5 nm and 2 nm are used to obtain spherical mesoporous platinum nanoparticles having average dimensions of between 8 nm and 12 nm. Even more preferably, the seeds having dimensions of 1.8 nm are used to obtain nanoparticles of 10 nm.

In another preferred embodiment, the seeds having average dimensions of between 2.5 nm and 3.5 nm are used to obtain platinum nanoparticles having average dimensions of between 18 nm and 22 nm.

Even more preferably, the seeds having dimensions of 3 nm are used to obtain nanoparticles having dimensions of 20 nm.

The platinum seeds having dimensions of between 1 and 3.5 nm can be obtained using any method known in the art, preferably according to the method described by Moglianetti et al. in the paper "Citrate-coated, size-tunable octahedral platinum nanocrystals: a novel route for advanced electrocatalyst." *ACS Appl. Mater. Interfaces,* 2018, 10 (48), pp 41608-41617.

The platinum seeds can be present in the solution at a concentration of between 1 nM and 100 nM in terms of particle molarity. The broad concentration range correlates with the broad range of diameters of the platinum seeds used in the synthesis process (1.5 nm-3.5 nm) in order to obtain final particles of 10-20 nm according to an inverse proportionality relationship. In particular, higher concentrations of seeds having a smaller diameter (1.5 nm-2 nm) are required to obtain smaller platinum nanoparticles (8-12 nm), while lower concentrations of the seeds having a larger diameter (2.5 nm-3.5 nm) are required to obtain larger nanoparticles (18 nm-22 nm).

The term "platinum ions precursor" refers to a chemical species that is able to provide platinum ions in an aqueous solution.

Said precursor is preferably a species that provides platinum (IV) ions.

Said precursor can be selected from the group comprising $H_2PtCl_6$, $Na_2PtCl_6$, $K_2PtCl_6$, $H_6Cl_2N_2Pt$, $PtCl_2$, $PtBr_2$, $Li_2PtCl_2$, $H_2Pt(OH)_6$, $Pt(NO_3)_2$, $PtSO_4$, $Pt(HSO_4)_2$, $Pt(ClO_4)_2$ and $K_2PtCl_4$.

The platinum ions precursor s preferably $H_2PtCl_6$.

The platinum ions precursor is preferably present at a concentration of between 0.01 mM and 50 mM, preferably between 0.1 mM and 10 mM, even more preferably at a concentration of 0.6 mM. The concentration of said precursor used for the synthesis of the nanoparticles is important since it can determine the dimensions of the nanoparticles obtained. This makes it possible to control the dimensions of the nanoparticles by modulating the concentration of platinum ions in the solution during the growth phase, as reported below.

The reducing agent used in the method of the present description can be an organic molecule having less than 8 carboxylic acid and/or carboxylate groups. The reducing agent may also have less than 6 hydroxy groups. Preferably, the reducing agent does not have more than 10 functional groups. Preferably, the reducing agent does not contain an amine group. Preferably, the reducing agent does not contain a functional group that strongly binds to the surface of a precious metal. These non-advantageous functional groups include one or more functional groups selected from the group comprising amine groups, thiol groups, phosphine groups and amide groups.

The reducing agent can be a small organic molecule wherein the term "small organic molecule" is defined as a molecule having not more than 10 functional groups, not more than 8 carboxylic or carboxylate functional groups, not more than 6 hydroxy groups and none amine functional group.

The reducing agent can be selected from the group comprising ascorbic acid, sodium citrate, 2-(carboxymethyl)-2-hydroxysuccinate, 3 hydroxybutane-1,2,3-tricarboxylate, 2-carboxy-D-arabinitol, 3,4-dicarboxy-3-hydroxibutanoate, dehydro-D-arabinono-1,4-lactone, 2-(carboxylatomethyl)-5-oxo-2,5-dihydro-2-furoate, 2-(carboxymethyl)-5-oxo-2,5-dihydro-2 furoic acid and mixtures thereof.

The reducing agent can be present in the solution in an amount of between 0.1 mM and 15 mM, preferably between 1.2 mM and 2 mM, even more preferably 1.8 mM.

The reducing agent can also act as a stabilizing agent.

According to a preferred embodiment, this agent is made of a mixture of sodium citrate and L-ascorbic acid.

The sodium citrate can be present in the solution in an amount of between 0.005 mM and 100 mM, preferably between 0.05 mM and 10 mM, more preferably 0.6 mM.

The L-ascorbic acid can be present in the solution in an amount of between 0.005 mM and 100 mM, preferably between 0.05 mM and 20 mM, more preferably 1.2 mM.

The small organic molecules play an important role in stabilizing the particles in the aqueous solution and preventing their aggregation, since, on account of their carboxylic groups and hydroxy groups, they weakly bind to the surface of the platinum nanoparticles. In this way, the molecules avoid the main aggregation processes and, at the same time, can be easily removed by simple washing with water, obtaining surfaces free of organic contamination.

The solution can be heated to a temperature of between 150° C. and 250° C., preferably between 190° C. and 220° C., even more preferably to 200° C.

The solution can be heated at a rate of between 1° C./minute and 15° C./minute for between 1 minute and 60 minutes. Preferably, the solution is heated at a rate of 10° C./minute for 20 minutes.

The heating rate during the initial phase plays a key role in promoting the mesoporous structure of the platinum nanoparticles. A faster heating rate of 15° C./min leads to the loss of control of the nanomaterials growth, and therefore to the formation of nanoparticles that do not comprise pores or nanoparticle aggregation followed by the loss of colloidal stability. The range mentioned above for the heating rate makes it possible to obtain a nanocrystal controlled reduction, which is a crucial condition for obtaining the porous morphology since it provides a sufficient amount of time for the atoms to move and create pores inside the solid structure. This range for the controlled reduction rate during the initial heating phase can also promote a higher precursor:seed ratio, which is an essential aspect for controlling the morphology.

The air in the container containing the solution is maintained at a pressure of between 5 and 20 atm, preferably between 14 and 16 atm, even more preferably the air is maintained at 15 atm.

In one embodiment of the present invention, the dissolved oxygen concentration in the aqueous solution is lower than the concentration of oxygen in an aqueous solution saturated with oxygen. The concentration of dissolved oxygen in the solution can be between 0.01 ppm and 20 ppm, preferably in the range of between 0.1 and 10 ppm.

The limited exposure to the oxygen is very important. In fact, the oxidative attack during the synthesis process is important and needs to be kept under control since the oxygen can oxidize the already reduced platinum atoms on the surface of the nanoparticles, thereby significantly interfering with the growth of the nanomaterial.

The inventors have found that it is possible to have mesoporous platinum nanoparticles, in particular having pores having a diameter of from 2 to 5 nm, without using templating agents, by controlling the reaction parameters, such as the reaction temperature, pressure, heat transfer rate and exposure to the oxygen.

The simultaneous lack of control of these parameters leads to spherical platinum nanoparticles composed of different small crystallites that are comparable to a flower shape and have high degree of surface roughness, as mentioned in Bigall et al. in "Monodisperse platinum nanospheres with adjustable diameters from 10 to 100 nm: synthesis and distinct optical properties," Nano Letters, Vol. 8, No. 12, 2008.

The rigorous control of these parameters therefore plays a crucial role in the formation of mesoporous structures; in fact, when carried out using the same compounds, at the same heat transfer rate and exposure to the oxygen in the presence of sodium citrate and L-ascorbic acid but without controlling the temperature and pressure, as indicated in the prior art, the same method does not produce nanoporous nanoparticles, but full flower-shaped nanoparticles having surface roughness, as illustrated below in Comparative Example 4. This result shows the crucial role of the synergy between the reaction parameters in order to grow mesoporous platinum nanoparticles.

The preparation method according to the invention makes it possible to obtain spherical mesoporous platinum nanoparticles having controlled dimensions both in terms of the overall dimensions of the particles and the diameter of the pores. The diameter of the pores is directly proportional to the overall dimensions of the particles. Nanoparticles of 10 nm display pores having a diameter of 2 nm, as shown in FIG. 2. Nanoparticles of 20 nm display pores having a diameter of 2.7 nm, as shown in FIG. 1.

Figure 1:
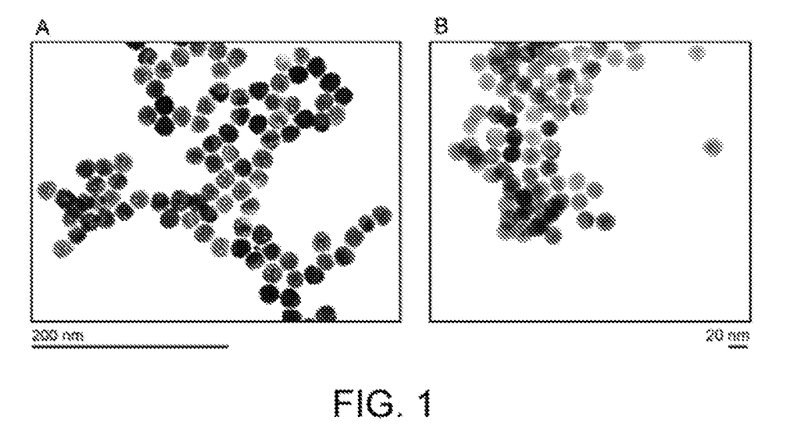
FIG. 1 shows representative bright-field ("BF") images taken using a transmission electron microscope (TEM) of porous platinum nanoparticles of 20±0.5 nm and with pores having average dimensions of 2.7±0.3 nm. The dimensions of the pores were measured using an FEI Tecnai G2 F20 TWIN microscope having a Schottky emitter operating at 200 kV.
Figure 2:
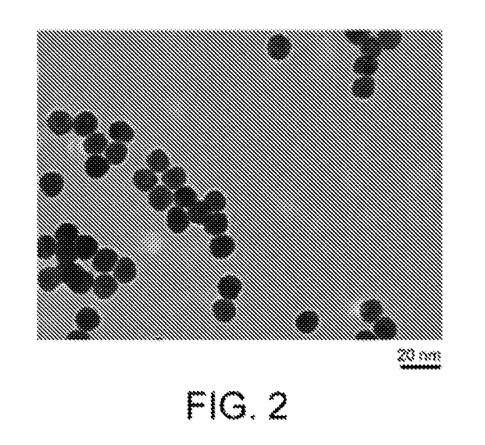
FIG. 2 shows representative bright-field (BF) images taken using a transmission electron microscope (TEM) of porous platinum nanoparticles having average dimensions of 10±0.5 nm and with pores having average dimensions of 2±0.3 nm. The dimensions of the pores were measured using an FEI Tecnai G2 F20 TWIN microscope having a Schottky emitter operating at 200 kV.

The pores are distributed homogeneously on the surface of the particles, as shown in FIG. 1.

The volume ratio between the volumes of the pores and the volume of the entire nanoparticle obtained by means of the method of the invention is between 0.15 and 0.20.

The number of pores on the nanoparticle varies from 30 to 45 per individual nanoparticle.

Figure 5:
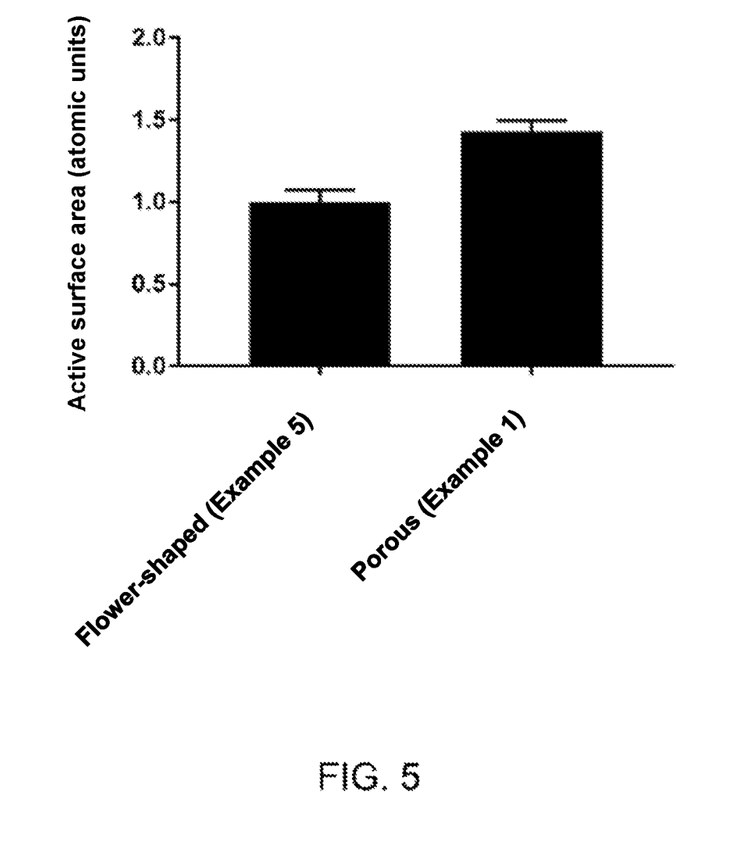
FIG. 5 shows a graph of the active surface areas, measured by a 3,3',5,5'-tetramethylbenzidine (TMB) test and an electrochemical method, of flower-shaped platinum nanoparticles of 20 nm obtained according to Example 3 and mesoporous platinum nanoparticles of 20 nm obtained using the method of the present patent application according to Example 1.

Each individual pore does not pass through the entire nanoparticle. FIG. 5 shows how the pores provide the platinum nanoparticles with greater active surface area than the platinum nanoparticles obtained according to the method known in the art without simultaneously controlling the temperature and pressure, shown in Example 4.

Figure 4:
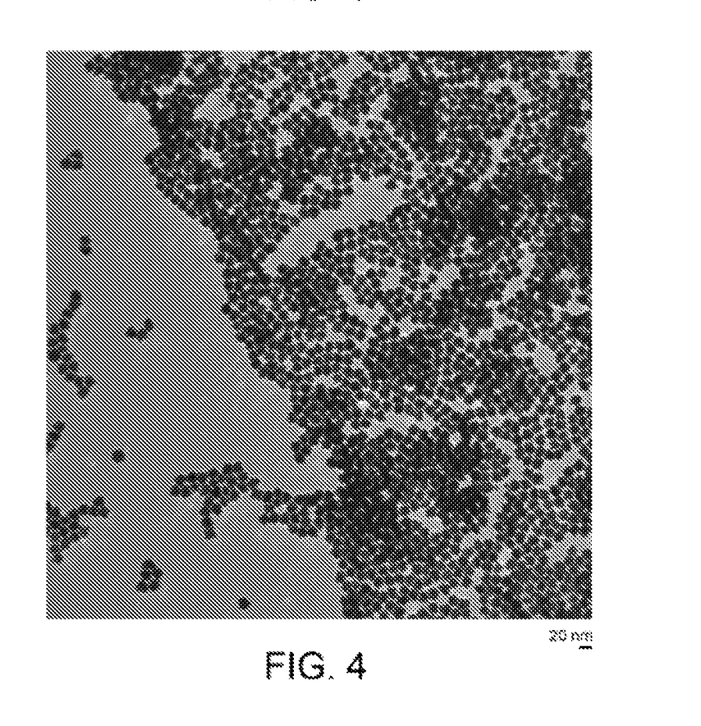
FIG. 4 shows representative bright-field (BF) images obtained using a transmission electron microscope (TEM) of flower-shaped dendritic nanoparticles.

The pores obtained by means of the method of the invention are completely different to the irregular cavities caused by the roughness on the surface of the platinum nanoparticles of the prior art, as shown in FIG. 4. The irregular cavities of the nanoparticles having dimensions of less than 1 nm-1.5 nm and a higher degree of dimensional distribution do not make it possible to control the characteristics of the pores, which is crucial for controlling the catalytic processes and for imitating the natural enzymes.

The present invention provides a new method for synthesizing spherical mesoporous platinum nanoparticles in aqueous environments, without the use of polymers, surfactants, hard-templating and any other sacrificial metals.

The particles obtained comprise pores that are covered only by sodium citrate and ascorbic acid molecules that are easily removable by delicate washing. This is extremely advantageous for industrial applications that involve highly selective catalytic reactions, since the lack of organic contamination preserves the catalytic properties of the nanoparticles. The method of the invention therefore makes it possible to obtain highly catalytic nanoparticles that do not require further post-synthesis treatment, other than simple washing which is intended to remove surface contaminants, in order for them to be able to be directly used as catalysts.

Furthermore, the invention makes it possible to obtain spherical mesoporous platinum nanoparticles with pores having controlled dimensions of 2-5 nm, which nanoparticles are uniform and can be functionalized with specific chemical groups, creating a specific chemical environment. This condition is essential for mimicking natural enzymes when carrying out highly selective catalytic processes.

The method does not involve the use of an organic solvent either and is therefore respectful of the environment.

The mesoporous platinum nanoparticles obtained by means of the method described herein can therefore advantageously be used as catalysts in the hydrogenation of alpha-ketoesters, hydrogenation of unsaturated olefins of different lengths and the reduction of aromatic compounds and nitroaromatic compounds.

The mesoporous platinum nanoparticles obtained by means of the method described herein can also be used in biological processes that involve nano-biological interactions, for example in the field of bio-enzymatic processes, but also for the production of artificial enzymes for diagnostics and nanomedicine applications.

The examples that follow are given purely as a non-limiting example of the scope of the invention, as defined by the appended claims.

Example 1 Method for Synthesizing Mesoporous Platinum Nanoparticles of 20 nm

The synthesis process was carried out in a microwave reactor using the multi-vessel setting, in closed containers at a pressure of 15 atm, 3.5 ml of solution containing platinum nanoparticles having average dimensions of approximately 3 nm which function as seeds (synthesized as per the method described by Moglianetti et al., mentioned above) were added to 95 ml of Milli-Q water. 100 µL of hexachloroplatinic acid 0.5 M were added to this first solution (therefore at a final concentration in the solution of 0.56 mM) together with 2 mL of aqueous sodium citrate 40 mM solution and L-ascorbic acid 70 mM. 15 vessels were sealed, placed inside the microwave chamber and brought to 200° C. in 20 minutes. The reaction was kept under these conditions for 10 minutes while being magnetically stirred at a moderate speed. The containers were then removed from the microwave reactor and left to cool down for 20 minutes. The particles obtained have diameters of 20 nm and pores of 2.7 nm, as shown in FIG. 1.

Example 2 Method for Synthesizing Mesoporous Platinum Nanoparticles of 10 nm

In order to examine the effect of the concentration of the platinum precursor and the dimensions of the platinum seeds on the dimensions of the nanoparticles and on the diameter of the pores contained therein, a synthesis process as described in Example 1 was carried out with the addition of seeds of platinum nanoparticles of 1.8 nm (instead of 3 nm) and the addition of 40 µL of hexachloroplatinic acid 0.5 M (instead of 100 L). Nanoparticles of 10 nm, which had pores having an average diameter of 2 nm, as shown in FIG. 2, were formed as the end result, therefore porous nanoparticles having overall dimensions and a pore diameter that are smaller than those obtained using 100 µL of hexachloroplatinic acid and platinum seeds of 3 nm.

This example shows that it is possible to control the overall dimensions of the particles and the dimensions of the pores by changing the concentration of the platinum precursor in the solution and the dimensions of the starting platinum seeds.

Example 3. Crystallographic Analysis of the Mesoporous Platinum Nanoparticles

Figure 3:
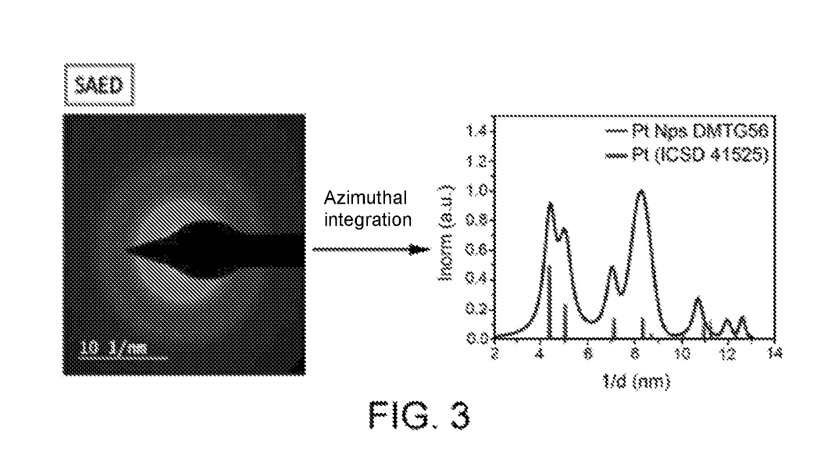
FIG. 3 shows in A) the electron diffraction pattern of the porous platinum nanoparticles obtained using selected area electron diffraction ("SAED") and shows in B) the intensity of the peaks that are characteristic of the platinum nanoparticles obtained by means of azimuthal integration of the electron diffraction pattern SAED (black line) compared with the peaks that are characteristic of databases and are obtained by an X-ray electron diffraction of platinum powders (vertical grey lines). The azimuthal integration and the comparison with the peaks provided by the database were made by means of a profile analysis using the software PASAD, as per the protocol reported in the scientific publication by C. Grammer et al. "Quantitative local profile analysis of nanomaterials by electron diffraction," Scripta Materialia 63 (2010), 312-315.

In order to verify the crystalline structure of the mesoporous platinum nanoparticles obtained according to Examples 1 and 2, an analysis was carried out using selected area electron diffraction (SAED) As shown in FIG. 3A, by means of said technique, an electron diffraction pattern having concentric rings was obtained, which is typical of a polycrystalline material. By means of a profile analysis of the pattern using PASAD software, azimuthal integration of the rings was then carried out, thereby obtaining the intensity of the peaks that are characteristic of the sample as a function of the k-vectors of the mutual space. Again, by means of the PASAD software, it was then possible to compare the peaks obtained by means of azimuthal integration of the electron diffraction pattern (black line) with the peaks that are characteristic of a sample of platinum powders that are present in databases and are obtained by means of X-ray diffraction (vertical grey lines). The analysis showed a crystalline face-centered cubic structure.

Example 4. Comparative Example. Method for Synthesizing Flower-Shaped Platinum Nanoparticles In order to examine the synergistic effect of controlling the pressure and the high reaction temperature on the shape and porosity of the nanoparticles, a synthesis process, as described in Example 1, was carried out using an apparatus having a reflux column, therefore at atmospheric pressure and an oil bath temperature of 110° C. To be specific, 3.5 ml of solution containing platinum nanoparticles having average dimensions of approximately 3 nm and which function as seeds (synthesized as per the method described by Moglianetti et al. mentioned above) were added to 95 ml of Milli-Q water. 100 µL of hexachloroplatinic acid 0.5 M were added to this first solution together with 2 mL of an aqueous solution containing sodium citrate 40 mM and L-ascorbic acid 70 mM. The container was placed in an oil bath and slowly brought to 110° C. The reaction was refluxed for 1 hour.

As the end result, flower-shaped platinum nanoparticles of 20 nm were formed, which were devoid of defined pores and characterized by a high degree of surface roughness, as shown in FIG. 4. The nanoparticles comprise irregular cavities in the surface that have dimensions of less than 1.5 nm, which cavities are not homogeneously distributed on the surface and have a high degree of polydispersion of the dimensions.

This comparative example shows how controlling the temperature and pressure is essential for obtaining mesoporous platinum nanoparticles having pores having a controlled shape and controlled dimensions.

Example 5. Comparative Measurements of the Active Surface Area of the Pores

In order to examine the greater active surface area of the mesoporous platinum nanoparticles obtained by means of the method of the invention in Example 1 compared with the surface area of the flower-shaped platinum nanoparticles in Example 4, catalytic measures were carried out by means of the TMB (3,3',5,5'-tetramethylbenzidine) test and electrochemical measurements. The TMB test was carried out using 3,3',5,5'-tetramethylbenzidine as per the protocol described in Moglianetti et al., Nanoscale. 2016, 8, 3739-3752. The electrochemical measurements were made using μAutolab type II PGSTAT (Metrohm) with the software General Purpose Electrochemical System (GPES) 4.9 and the hand-held potentiostat PaimSens (PalmsSens By).

The surface of the nanoparticles obtained by means of the method of the invention was 35-40% greater than the comparative active surface area of the flower-shaped nanoparticles, as shown in the graph in FIG. 5.

The invention claimed is:

1. A method for producing mesoporous platinum nanoparticles, the method comprising:
   providing a solution comprising water, platinum nanoparticle seeds, a platinum ion precursor and a reducing agent; and
   heating the solution to a temperature of between 150° C. and 250° C. at a rate of between 1° C./min and 15° C./min under a pressure of between 5 atm and 20 atm.

2. The method of claim 1, wherein the platinum ion precursor is selected from the group consisting of $H_2PtCl_6$, $Na_2PtCl_6$, $K_2PtCl_6$, $H_6Cl_2N_2Pt$, $PtCl_2$, $PtBr_2$, $Li_2PtCl_1$, $H_2Pt(OH)_6Pt(NO_3)_2$, $PtSO_4$, $Pt(HSO_4)_2$, $Pt(ClO_4)_2$, $K_2PtCl_4$, hydrates thereof and mixtures thereof.

3. The method of claim 1, wherein the platinum ion precursor is $H_2PtCl_6$.

4. The method of claim 1, wherein the platinum ion precursor is present at a concentration of between 0.01 mM and 50 mM.

5. The method of claim 1, wherein the reducing agent is an organic molecule having less than 8 carboxylic acid and/or carboxylate groups, and less than 6 hydroxy groups.

6. The method of claim 1, wherein the reducing agent is selected from the group consisting of ascorbic acid, sodium citrate, 2-(carboxymethyl)-2-hydroxysuccinate, 3-hydroxybutane-1, 2, 3-tricarboxylate, 2-carboxy-D-arabinitol, 4-dicarboxy-3-hydroxibutanoate, dehydro-D-arabinono-1, 4-lactone, 2-(carboxylatomethyl)-5-oxo-2,5-dihydro-2-furoate, 2-(carboxymethyl)-5-oxo-2, 5-dihydro-2 furoic acid and mixtures thereof.

7. The method of claim 1, wherein the reducing agent is a mixture of sodium citrate and L-ascorbic acid.

8. The method of claim 1, wherein the reducing agent is present in the solution in an amount of between 0.1 mM and 15 mM.

9. The method of claim 1, wherein the solution is heated to a temperature of between 190° C. and 220° C.

10. The method of claim 1, wherein the pressure of the solution is between 14 atm and 16 atm.

11. The method of claim 1, wherein the solution is heated at a rate of between 8° C./min and 11° C./min.

* * * * *